(12) United States Patent
Overly, III et al.

(10) Patent No.: US 8,048,470 B2
(45) Date of Patent: Nov. 1, 2011

(54) COATED CONFECTIONARY PRODUCT

(75) Inventors: Harry J. Overly, III, Chicago, IL (US); Caryn M. Doerr, Chicago, IL (US)

(73) Assignee: WM. Wrigley, Jr. Company, Chicago, IL (US)

(*) Notice: Subject to any disclaimer, the term of this patent is extended or adjusted under 35 U.S.C. 154(b) by 1449 days.

(21) Appl. No.: 11/342,302

(22) Filed: Jan. 27, 2006

(65) Prior Publication Data

US 2006/0257549 A1   Nov. 16, 2006

Related U.S. Application Data

(60) Provisional application No. 60/649,044, filed on Feb. 1, 2005.

(51) Int. Cl.
*A23G 3/00* (2006.01)

(52) U.S. Cl. ............................... 426/660; 426/516

(58) Field of Classification Search ............... 426/516, 426/660
See application file for complete search history.

(56) References Cited

U.S. PATENT DOCUMENTS

| | | | |
|---|---|---|---|
| 2,600,569 A * | 6/1952 | Oakes ........................... | 426/474 |
| 2,621,128 A * | 12/1952 | Webb et al. ................... | 426/580 |
| 3,265,508 A * | 8/1966 | Wurzburg et al. ............ | 426/516 |
| 3,857,965 A * | 12/1974 | Ream .............................. | 426/3 |
| 4,150,161 A * | 4/1979 | Rudolph et al. ............... | 426/3 |
| 4,241,099 A | 12/1980 | Tiemstra | |
| 4,724,150 A * | 2/1988 | Knebl et al. .................. | 426/3 |
| 5,362,508 A | 11/1994 | Wheeler et al. | |
| 5,437,879 A | 8/1995 | Kabse et al. | |
| 5,458,892 A * | 10/1995 | Yatka et al. .................. | 426/5 |
| 5,458,894 A | 10/1995 | Knebl et al. | |
| 5,472,733 A | 12/1995 | Degady et al. | |
| 5,626,896 A | 5/1997 | Moore et al. | |
| 5,900,261 A * | 5/1999 | Ribadeau-Dumas et al. .... | 426/5 |
| 6,432,460 B1 * | 8/2002 | Zietlow et al. ............... | 426/74 |
| 6,444,240 B1 | 9/2002 | Barkalow et al. | |
| 6,500,474 B2 | 12/2002 | Cross et al. | |
| 6,558,727 B2 | 5/2003 | Degady et al. | |
| 6,562,382 B1 | 5/2003 | Corriveau et al. | |
| 6,616,963 B1 | 9/2003 | Zerby et al. | |
| 6,623,266 B2 * | 9/2003 | Jani et al. ..................... | 425/517 |

(Continued)

FOREIGN PATENT DOCUMENTS

EP    0 273 856 A1    4/1987

(Continued)

OTHER PUBLICATIONS

R. Lees et al., Sugar Confectionery and Chocolate Manufacture, 1973, Leonard Hill Books, 161-171.*

(Continued)

*Primary Examiner* — Jyoti Chawla
(74) *Attorney, Agent, or Firm* — Brinks Hofer Gilson & Lione; Steven P. Shurtz

(57) ABSTRACT

A method of producing a confectionary product includes providing a chewy material and a candy material. The candy material includes a sweetener and is at least in part amorphous. The water activity of the chewy material is greater than the water activity of the candy material. The chewy material and the candy material are disposed adjacent to each other. Nucleating sites are created in the candy material. Water is allowed to migrate from the chewy material to the candy material. The amorphous candy material is allowed to crystallize at least in part.

34 Claims, 2 Drawing Sheets

U.S. PATENT DOCUMENTS

| | | |
|---|---|---|
| 6,623,784 B2 | 9/2003 | Zerby et al. |
| 6,783,783 B2 | 8/2004 | Clark et al. |
| 2002/0090421 A1 | 7/2002 | Cross et al. |
| 2003/0198713 A1 | 10/2003 | Clark et al. |
| 2003/0219514 A1 | 11/2003 | Jones et al. |
| 2004/0058055 A1 | 3/2004 | Delebarre |
| 2004/0175489 A1 | 9/2004 | Clark et al. |
| 2004/0191402 A1 | 9/2004 | Stawski et al. |
| 2004/0253347 A1 | 12/2004 | Gaonkar et al. |

FOREIGN PATENT DOCUMENTS

| | | |
|---|---|---|
| EP | 0 813 817 A1 | 12/1997 |
| EP | 1 006 128 A1 | 6/2000 |
| EP | 1 234 506 A1 | 8/2002 |
| EP | 1 388 294 A1 | 2/2004 |
| EP | 0 652 714 B1 | 3/2004 |
| EP | 1 440 620 A1 | 7/2004 |
| JP | 09052850 A * | 2/1997 |
| WO | WO 00/32057 | 6/2000 |
| WO | WO 02/092027 A2 | 11/2002 |
| WO | WO 2004/019922 A1 | 3/2004 |
| WO | WO 2005/065461 A1 | 7/2005 |

OTHER PUBLICATIONS

Fred Hintlian, Filled hard Candy, Oct. 1995, The Manufacturing Confectioner, pp. 61-66.*

Web page printed from the Internet at http://www.mentos.com, accessed Dec. 3, 2004, 1 page.

* cited by examiner

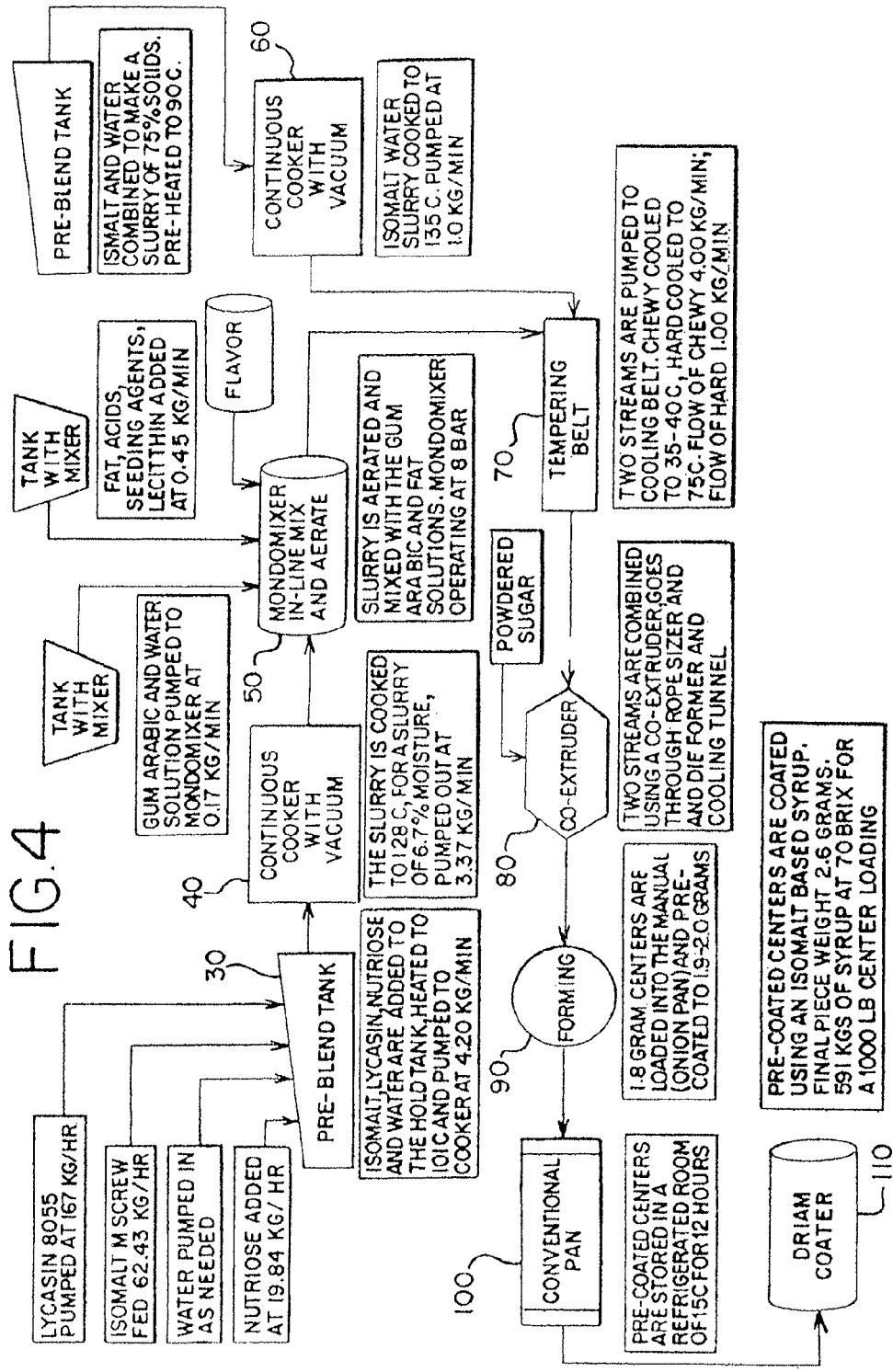

COATED CONFECTIONARY PRODUCT

RELATED APPLICATIONS

This application claims the benefit of U.S. Provisional Patent Application No. 60/649,044, filed Feb. 1, 2005, the entire disclosure of which is hereby incorporated herein by reference

BACKGROUND

Numerous coated confectionaries are available. Many confectionaries, such as M&M's or chewing gum balls, have a hard shell sugar coating. Some products, such as M&M's CRISPIES, have a hard center, with a chocolate covering followed by a hard shell coating. Other products include a chewy center with a hard candy shell. Thus confectionary products with multiple layers and coatings are known.

However, producing a product with a chewy center and a hard shell can cause processing difficulties, especially with controlling the crystallinity and moisture levels in the product. It is difficult to coat a soft center with a hard coating. Also, hard shells can be brittle and difficult to package without damaging the product or causing the hard shell to chip off or break.

BRIEF SUMMARY

In one aspect, a method of producing a confectionary product includes providing a chewy material and a candy material. The candy material includes a sweetener and is at least in part amorphous. The water activity of the chewy material is greater than the water activity of the candy material. The chewy material and the candy material are disposed adjacent to each other. Nucleating sites are created in the candy material. Water is allowed to migrate from the chewy material to the candy material. The amorphous candy material is allowed to crystallize at least in part.

In another aspect, a method of preparing a confectionary product includes providing a chewy material including a sweetener and providing a candy material including an amorphous sweetener. Nucleating sites are created in the candy material. The chewy material is coated with the candy material to form a jacketed material. The jacketed material is coated with a hard shell coating. The amorphous sweetener is allowed to at least partially crystallize.

In another aspect, a confectionary product includes a chewy center, an intermediate coating, and a crunchy outer layer. The chewy center includes an indigestible dextrin, a sweetener, water, and flavor. The intermediate coating includes a sweetener and flavor, and is at least partially crystalline. The crunchy hard shell outer layer includes the sweetener and flavor.

The foregoing and other features and advantages of the present invention will become apparent from the following detailed description of the presently preferred embodiments, when read in conjunction with the accompanying examples.

BRIEF DESCRIPTION OF THE DRAWINGS

FIG. 4 shows one embodiment of a process for producing the confectionary product of FIG. 2.

DETAILED DESCRIPTION OF THE DRAWINGS AND PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
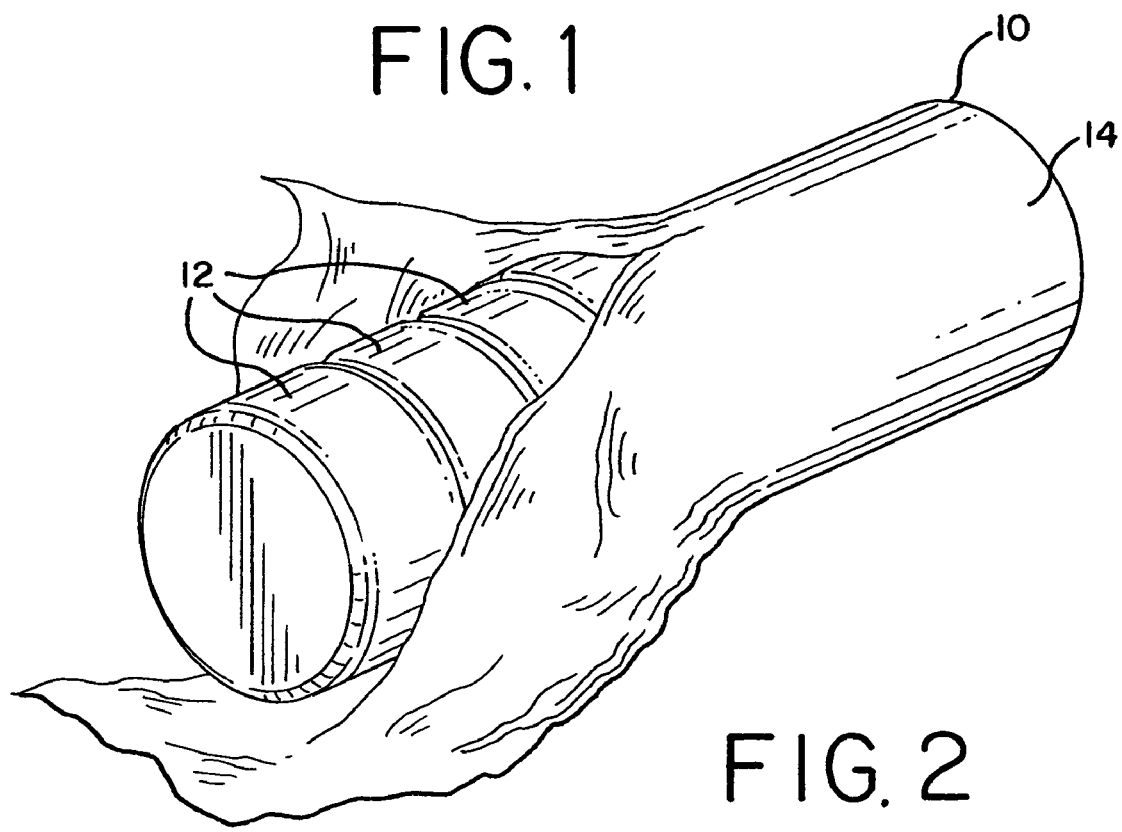
FIG. 1 shows an embodiment of a pack of confectionary products.
Figure 2:
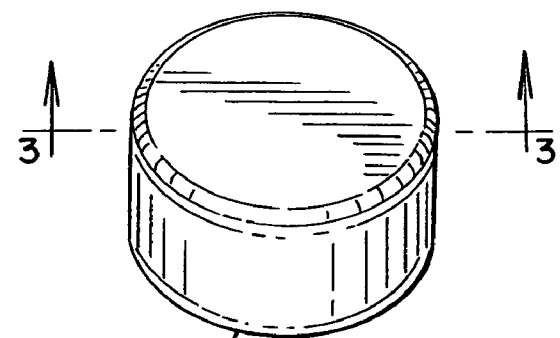
FIG. 2 shows one embodiment of a confectionary product.

One embodiment of a pack 10 of confectionary products 12 is shown in FIG. 1. While products of the present invention may be made in a wide variety of shapes, one embodiment of the confectionary product 12 is shown in FIG. 2. The confectionary product 12 has a cylindrical shape and is about 16-22 mm in diameter and about 8-12 mm high. However, other shapes and dimensions of the confectionary product are possible.

Figure 3:
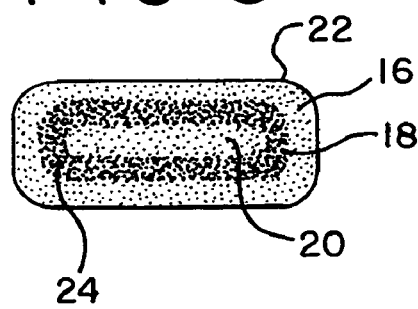
FIG. 3 shows a cross section along 3-3 of the confectionary product of FIG. 2.

As best seen in FIG. 3, the confectionary product has a center 20, an intermediate layer 24, and an outer layer 22. The center 20 is chewy and includes an indigestible dextrin, a sweetener, water, and flavor. The intermediate layer 24 includes a sweetener and flavor, and is at least partially crystalline. In one embodiment, the intermediate layer 24 includes a crystalline portion 18 and an amorphous portion 16. The outer layer 22 is a crunchy hard shell and includes a sweetener and flavor.

In one embodiment, the indigestible dextrin in the chewy center includes a branched maltodextrin such as NUTRIOSE®. The expression "branched maltodextrin" includes maltodextrins as described in European patent publication EP 1 006 128. These branched maltodextrins exhibit an indigestibility character which has the consequence of reducing their calorific value, by preventing their assimilation in the small intestine. They therefore represent a source of indigestible fiber which is beneficial for metabolism and for intestinal balance.

As a general matter, sweeteners used in the confectionary product may include, but are not limited to, sugars, corn syrup, polyols, hydrogenated starch hydrolysate syrup and combinations thereof. In one embodiment, the sweetener in the chewy center, the intermediate layer, and the outer layer includes sucrose and corn syrup. Different sweeteners may be used in the different layers of the confectionary product.

A conventional hard candy formulation may be used for the intermediate later and the outer layer. In one embodiment, the hard candy is made with sucrose and corn syrup blends. A blend of 60/40 is a typical sucrose/syrup blend made for hard candy. Other sugars such as dextrose or lactose, along with corn syrups, may also be used for making a hard candy.

For a sugarless product, polyols are generally used, such as hydrogenated isomaltulose (which is also called isomalt), xylitol, maltitol and hydrogenated starch hydrolysates (HSH). In addition, isomalt/xylitol blends, isomalt/maltitol blends, isomalt/hydrogenated starch hydrolysate blends or maltitol/HSH blends may be used. Thus, in one embodiment, the sweetener is a non-sugar sweetener such as a polyol (such as isomalt) and a maltitol syrup (such as LYCASIN®).

In one embodiment, the chewy center also includes gum arabic and a fat such as HPKO (hydrogenated palm kernel oil). In one embodiment, the chewy center also includes lecithin and a glyceride. The chewy center also includes flavor. The flavor may be any suitable flavor, such as menthol. In one embodiment, the chewy center does not include starch. In another embodiment, the chewy center does not include gelatin.

The flavors used in the various layers of the confectionary product may include cooling agents such as menthol as well as essential oils, synthetic flavors, or mixtures including but not limited to oils derived from plants and fruits such as citrus oils, fruit essences, peppermint oil, spearmint oil, clove oil, oil of wintergreen, anise and the like. Artificial flavoring components are also contemplated for use in the confectionary product. Those skilled in the art will recognize that natural and artificial flavoring agents may be combined in any sensorially acceptable blend. All such flavors and flavor blends are contemplated by the present invention.

Colors and other additives are also contemplated for use in the confectionary product. Colors commonly used are FD&C dyes and some natural colors. Preferably, FD&C dyes are used. Other natural colors include colors such as chlorophyll, curcumin, caramel, carmine, annatto, and other similar types of colors. While the chewy center, intermediate layer, and outer layer may comprise a color, one, two, or all three layers can be uncolored, and if a color is used, it may be the same or different in each of the three layers.

In one embodiment, a method of producing the confectionary product includes providing a chewy material and a candy material. While not intending to be bound by any particular theory, the relative chewiness and crunchiness of the layers of the confectionary product are determined in part by the crystallinity and moisture content of the respective layers. The candy material includes a sweetener. The sweetener is at least in part amorphous. The water activity of the chewy material is greater than the water activity of the candy material. Water activity is the relative availability of water in a substance. Water activity is defined as the vapor pressure of water in a material divided by the vapor pressure of pure water at a given temperature. Water tends to migrate from a material with a high water activity to a material with a lower water activity. In one embodiment, the moisture content of the chewy material is greater than the moisture content of the candy material. The chewy material and the candy material are disposed adjacent to each other. Nucleating sites are created in the candy material to promote crystallization. Nucleating sites may also be created in the chewy center, which will then all crystallization to begin at the interface between the chewy center and the candy material. Water is allowed to migrate from the chewy material to the candy material. The amorphous candy material is allowed to crystallize at least in part. Thus, the crystallinity and moisture content of the candy material increases, making it less crunchy and more chewy.

In one embodiment, the step of creating nucleating sites in the candy material includes disposing a seeding agent adjacent the candy material. The seeding agent may be a crystalline material such as powdered sugar. In another embodiment, crystallinity is induced in the chewy material and the crystals in the chewy material adjacent the candy material act as nucleating sites.

The confectionary product may be produced by any suitable method. One embodiment of a method of preparing the confectionary product is shown in FIG. 4. As a brief overview, a sweetener and an indigestible dextrin are provided in pre-blend tank 30. This mixture goes to cooker 40, and then to mixer and aerator 50 (such as a mondomixer), to provide a chewy material. Various other ingredients are also added to mixer 50. Ingredients for the candy material are provided to cooker 60. The chewy material and candy material are cooled on belt 70. The chewy material and candy material are disposed together in step 80, such as by co-extrusion, and then formed into individual pieces at forming step 90. The pieces are pre-coated in a conventional pan 100. A final coating is then applied at Driam coater 110.

There are several ways to control the crystallinity and grain size in the layers of the confectionary product. These control methods include adjusting the sweeteners in the chewy material, controlling the shear in the co-extruder, and the use of seed crystals. Specifically, increasing the amount of corn syrup relative to the amount of sugar in the chewy material will decrease crystallization. Increasing the amount of shear in the co-extruder will increase crystallization and increase the number of nucleation sites in the material. Seed crystals, such as powdered sugar, may be added at various stages in the process (such as in the mondomixer and in the co-extruder) to provide nucleation sites to promote crystallization.

One embodiment of the process for producing the confectionary product will now be discussed in more detail. A chewy material including a sweetener is provided. In one embodiment, the sweetener includes corn syrup and sucrose. In another embodiment, the sweetener is a non-sugar sweetener such as LYCASIN® and isomalt. The sweetener, water, and an indigestible dextrin are mixed in a pre-blend tank. In one embodiment, the indigestible dextrin includes a branched maltodextrin such as NUTRIOSE®. The mixture is heated and pumped to a cooker. The slurry is cooked under vacuum to the desired moisture level. In one embodiment, the desired moisture level in the slurry coming out of the cooker is in the range of about 6% to about 8%, preferably in the range of about 7.2% to about 7.8%.

The slurry is then added to a mixing device. In one embodiment, the mixing device includes aeration. In one embodiment, the mixing device is a mondomixer, which aerates and provides in-line mixing. Alternatively, the chewy material could be pulled (like taffy) to provide aeration. A variety of other materials may be added to this mixing step, such as binders, texturing agents, and seeding agents. In one embodiment, a gum arabic solution is added. In one embodiment, a fat, acid, powered sugar and lecithin mixture is added. A flavor may also be added at this stage. If a seeding agent is added, the chewy stream may begin to crystallize. In the mondomixer, the resulting slurry is mixed and aerated to form a chewy center stream.

A candy material stream is formed from a sweetener and water to make a slurry of about 75% solids. In one embodiment, the sweetener is sucrose. In another embodiment, the sweetener is isomalt. The candy material stream may also include starch, water, colorings such as titania, and flavor. The candy material stream is heated and cooked under vacuum to reach a desired moisture level of 4% (96% solids). The candy material includes an amorphous sweetener.

The chewy center stream and the candy material stream are then pumped to a cooling belt. In one embodiment, the chewy stream is cooled to about 35-40° C., and the candy material to about 75° C. The relative flow rates of the chewy material and the candy material are determined in part by the desired composition of the confectionary product. In one embodiment, the flow of the chewy stream is about four times the flow of the candy material. At this stage, the candy stream is about 96% solids and the chewy center stream is about 92% solids. In one embodiment, a nucleating agent such as powdered sugar is added to the chewy stream. The chewy material is coated with the candy material to form a jacketed material. In one embodiment, the chewy stream and the candy material stream are combined in a co-extruder, with the candy material stream surrounding the chewy stream. The co-extruder is preferably operated at a low shear rate to prevent excessive crystallization of the material streams. Additionally, too high a pressure in the co-extruder may also cause any fat present in the chewy stream to separate out, which is undesirable. The co-extruded stream is sent through a rope sizer to reduce the diameter of the stream.

The stream is then formed into individual candy pieces. In one embodiment, the individual candy pieces are about 1.8 g each. The resulting candy pieces are loaded into a conventional pan and pre-coated with a sweetener solution. In one embodiment, the sweetener solution includes sugar. In one embodiment, the pre-coat solution includes gum arabic. In one embodiment, the pre-coat solution includes about 60% water, 12% gum arabic, and 28% powdered sugar. Alternatively, the pre-coating step may be skipped.

In one embodiment, the individual pieces are then transferred to a conventional pan and stored in a refrigerated room, preferably at about 15° C. for about 12 hours. The pieces are then coated with a hard shell coating. The step of coating the pieces with a hard shell coating can occur before or after the candy material reaches crystallization equilibrium. In one embodiment, the pre-coated centers are coated in a hard panning operation in a Driam coater with a sugar syrup to create a candy product. In a hard panning operation, hot liquid syrups containing sugars or polyols are used and dried with air, crystals are formed that are hard and crunchy. The use of a Driam coater to coat a confectionary product is described in U.S. Pat. No. 6,444,240, the contents of which are hereby incorporated by reference.

The process produces a confectionary product with three layers: a chewy center, an amorphous intermediate layer, and a hard candy shell. The amorphous sweetener in the intermediate layer is allowed to at least partially crystallize, which makes the intermediate layer chewier. Preferably, the candy material intermediate layer crystallizes over the course of 3-4 weeks, so that by the time the confectionary product reaches the consumer it has the desired texture. Thus, the process is able to coat the individual candy pieces while hard (as they come out of the co-extruder), while during the normal distribution time a portion of the candy layer became soft. The candy pieces may be packaged before the hard candy shell becomes brittle.

EXAMPLES

Example 1

A confectionary product was prepared from the process depicted in FIG. 4. LYCASIN® (167 kg/hr), isomalt (62.43 kg/hr), water (as needed), and NUTRIOSE® (19.84 kg/hr) were mixed in a pre-blend tank. The mixture was heated at 101° C. and pumped to a cooker at 4.20 kg/min. The slurry was cooked to 128° C. under vacuum to the desired moisture level of 6.7%. The slurry was then added at 3.37 kg/min to the mondomixer. Also added to the mondomixer are: a gum arabic and water solution at a 1:2 gum arabic to water ratio (0.17 kg/min); a mixture including about 72% fat, 25% powdered sugar, 1.7% glyceride and 1.7% lecithin (0.45 kg/min); and flavor (0.004 kg/min). In the mondomixer, the resulting slurry was mixed and aerated to form a chewy center stream. The mondomixer operated at 8 bar.

A candy material stream was formed from isomalt and water to make a slurry of 75% solids. The candy material stream was preheated to 90° C. and cooked under vacuum to 135° C.

The chewy center stream and the candy material stream were each pumped to a cooling belt. The chewy stream was cooled to about 35-40° C. and the candy material was cooled to about 75° C. The flow of the chewy stream (4.0 kg/min) was four times the flow of the candy material (1.0 kg/min). Powdered sugar (0.11 kg/min) was added around the chewy stream. The chewy stream and the candy material stream combined in a co-extruder, with candy material stream surrounding the chewy stream. The co-extruded stream was sent through a rope sizer to reduce the diameter of the stream. The stream was then formed into individual candy pieces of about 1.8 g each.

The resulting candy pieces were loaded into a conventional pan and pre-coated with an isomalt—water solution (about 70% isomalt) to about 1.9-2.0 g. They were then transferred to a conventional pan and stored in a refrigerated room at 15° C. for 12 hours. The pre-coated centers were then coated in a Driam coater with an isomalt—water syrup (about 70% isomalt) to create a candy product of 2.6 g.

Examples 2-8

A variety of confectionary products were made according to the general process as shown in FIG. 4. The moisture levels in the chewy material stream ranged from 6% to 7% and the NUTRIOSE® levels ranged from 6% to 10%. The composition of the chewy center material is shown in Tables 1 and 2. The composition of the coating is shown in Table 3. The products included 67.5% of the chewy center, and 32.5% of the hard shell coating.

In Example 2, the chewy material stream included 7% moisture and 6% NUTRIOSE®. In Example 3, the chewy material stream included 7% moisture and 10% NUTRIOSE®. In Example 4, the chewy material stream included 6.5% moisture and 8% NUTRIOSE®. In Example 5, the chewy material stream included 6% moisture and 10% NUTRIOSE®. In Example 6, the chewy material stream included 6% moisture and 6% NUTRIOSE®. In Example 7, the chewy material stream included 6.0% moisture and 8% NUTRIOSE®. In Example 8, the chewy material stream included 7% moisture and 8% NUTRIOSE®. The target piece weight in each case was 2.66 g. The formulations in Examples 2-8 produced confectionary products with acceptable properties.

TABLE 1

| Ingredient | Solids % | Example 2 Weight % | Example 3 Weight % | Example 4 Weight % |
|---|---|---|---|---|
| Corn Syrup 42DE | 82% | 32.8% | 27.2% | 30% |
| Sugar | 100% | 32.8% | 27.2% | 30% |
| Water | 0% | 10.8% | 18% | 14.4% |
| Nutriose ® | 100% | 6.0% | 10.0% | 8% |
| Water | 0% | 4.2% | 4.2% | 4.2% |
| Gum Arabic | 100% | 2.1% | 2.1% | 2.1% |
| Fat - HPKO | 100% | 8.0% | 8.0% | 8.0% |
| Glyceride | 100% | 0.19% | 0.19% | 0.19% |
| Lecithin | 100% | 0.19% | 0.19% | 0.19% |
| Powdered Sugar | 100% | 2.74% | 2.74% | 2.74% |
| Flavor | 100% | 0.1125% | 0.1125% | 0.1125% |
| Total | | 100% | 100% | 100% |

TABLE 2

| Ingredient | Example 5 Weight % | Example 6 Weight % | Example 7 Weight % | Example 8 Weight % |
|---|---|---|---|---|
| Corn Syrup 42DE | 27.2% | 32.8% | 30.0% | 30.0% |
| Sugar | 27.2% | 32.8% | 30.0% | 30.0% |

TABLE 2-continued

| Ingredient | Example 5 Weight % | Example 6 Weight % | Example 7 Weight % | Example 8 Weight % |
|---|---|---|---|---|
| Water | 18% | 10.8% | 14.4% | 14.4% |
| Nutriose ® | 10.0% | 6.0% | 8.0% | 8.0% |
| Water | 4.2% | 4.2% | 4.2% | 4.2% |
| Gum Arabic | 2.1% | 2.1% | 2.1% | 2.1% |
| Fat - HPKO | 8% | 8.0% | 8.0% | 8.0% |
| Glyceride | 0.19% | 0.19% | 0.19% | 0.19% |
| Lecithin | 0.19% | 0.19% | 0.19% | 0.19% |
| Powdered Sugar | 2.74% | 2.74% | 2.74% | 2.74% |
| Flavor | 0.1125% | 0.1125% | 0.1125% | 0.1125% |
| Total | 100% | 100% | 100% | 100% |

TABLE 3

| Ingredient | Solids % | Wet Wt. | Weight % |
|---|---|---|---|
| Sugar | 100% | 1858 | 66.4% |
| Instag - Starch | 100% | 146 | 5.2% |
| Water | 0% | 790 | 28.2% |
| TiO2 | 100% | 4.48 | 0.16% |
| Flavor | 100% | 1.05 | 0.0375% |
| Total | | 2800.0000 | 100% |

The amount of crystallinity was controlled to obtain the desired amount of chewy and hard material. The process had the benefit of being able to coat the individual candy pieces while hard (as they came out of the co-extruder), while during the normal distribution time a portion of the candy layer became soft.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A method of producing a confectionary product comprising
   a) providing a chewy material having a water activity, and a water content of between about 6% and 8%, wherein the chewy material comprises sweetener, indigestible dextrin and fat, and does not comprise a chewing gum base;
   b) providing a candy material having a water activity and comprising sweetener, wherein the candy material is at least primarily amorphous and the water activity of the chewy material is greater than the water activity of the candy material;
   c) disposing the chewy material and the candy material adjacent to each other such that the amorphous candy material surrounds the chewy material;
   d) creating nucleating sites in the candy material;
   e) coating the combined candy material and chewy material with a coating; and
   f) migrating water from the chewy material to the candy material in an amount sufficient such that at least a portion of the amorphous candy material crystallizes.

2. The method of claim 1 wherein the step of creating nucleating sites in the candy material comprises disposing a seeding agent between the chewy material and the candy material.

3. The method of claim 2 wherein the seeding agent comprises powdered sugar.

4. The method of claim 1 wherein the chewy material comprises a sugar.

5. The method of claim 4 wherein the sugar is sucrose and the chewy material further comprises corn syrup.

6. The method of claim 1 wherein the candy material comprises a sugar and is a hot, pliable hard candy when it is provided.

7. The method of claim 1 wherein the step of coating the combined candy material and chewy material comprises coating the chewy material and the candy material with a hard shell coating using a hard panning operation.

8. The method of claim 7 wherein the step of coating the chewy material and the candy material with a hard shell coating occurs before the candy material reaches crystallization equilibrium.

9. The method of claim 1 wherein the step of disposing the chewy material and the candy material adjacent to each comprises co-extruding the candy material and the chewy material, with the candy material on the outside of the chewy material.

10. A method of preparing a confectionary product comprising:
    a) providing a chewy material having a water activity and comprising sweetener, indigestible dextrin and fat, and a water content of between about 6% and 8%, wherein the chewy material does not comprise a chewing gum base;
    b) providing a candy material having a water activity and which primarily comprises an amorphous sweetener, wherein the water activity of the chewy material is greater than the water activity of the candy material;
    c) creating nucleating sites in the candy material;
    d) coating the chewy material with the candy material to form a jacketed material;
    e) coating the jacketed material with a hard shell coating using a hard panning operation; and
    f) migrating water from the chewy material to the candy jacket material so that the amorphous sweetener at least partially crystallizes so that at least part of the candy material jacket becomes chewier.

11. The method of claim 10 wherein the step of coating the chewy material with the candy material to form a jacketed material occurs before the step of creating nucleating sites in the candy material.

12. The method of claim 10 wherein the step of creating nucleating sites in the candy material comprises disposing a seeding agent adjacent the candy material.

13. The method of claim 12 wherein the seeding agent is powdered sugar.

14. The method of claim 10 wherein the step of coating the chewy material with the candy material comprises co-extruding the chewy material and the candy material.

15. The method of claim 14 further comprising rope sizing the co-extruded jacketed material.

16. The method of claim 10 further comprising forming the jacketed material into candy pieces.

17. The method of claim 10 wherein the step of providing a chewy material comprising a sweetener and fat comprises providing a first material comprising a sweetener and a second material comprising a fat, and aerating the first and second materials together.

18. The method of claim 17 further comprising adding a seeding agent to the second material.

19. The method of claim 18 wherein the seeding agent is powdered sugar.

20. The method of claim 10 wherein the amorphous sweetener comprises sucrose and corn syrup.

21. The method of claim 10 wherein the sweetener in the chewy material comprises sucrose and corn syrup.

22. The method of claim 10 wherein the amorphous sweetener comprises hydrogenated starch hydrolysate syrup and isomalt.

23. The method of claim 10 wherein the sweetener in the chewy material comprises hydrogenated starch hydrolysate syrup and isomalt.

24. The method of claim 10 wherein the chewy center further comprises gum arabic.

25. A method of preparing a confectionary product comprising:
   a) providing a chewy material having a water activity and comprising sweetener, indigestible dextrin and fat, and a water content of between about 6% and 8%, wherein the chewy material does not comprise a chewing gum base;
   b) aerating the chewy material;
   c) providing a candy material having a water activity and which primarily comprises an amorphous sweetener, wherein the water activity of the chewy material is greater than the water activity of the candy material;
   d) contacting the candy material with a seeding material;
   e) co-extruding the chewy material and the candy material to form a jacketed material;
   f) forming the jacketed material into individual pieces;
   g) coating the individual pieces with a hard shell coating using a hard panning operation; and
   h) migrating water from the chewy material to the candy material so that the amorphous sweetener at least partially crystallizes so that at least part of the candy material becomes chewier.

26. A method of producing a confectionary product comprising three layers; comprising
   a) providing an amorphous candy material having a first water activity;
   b) providing a chewy candy material having a water content of between about 6% and about 8% and a second water activity that is greater than the first water activity, wherein the chewy candy material comprises sweetener, indigestible dextrin and fat, and does not comprise a chewing gum base;
   c) forming the amorphous candy material and the chewy candy material into a rope such that the amorphous candy material forms a second layer surrounding the chewy candy material as a first layer;
   d) providing a seeding agent, wherein the seeding agent is deposited onto or into the amorphous candy material before the amorphous candy material and chewy candy material are combined;
   e) forming the rope into pieces; and
   f) coating the pieces using a hard panning operation to form the third layer.

27. The method of claim 26 wherein the step of forming the rope comprises co-extruding the amorphous candy material and the chewy candy material, with the amorphous candy material on the outside of the chewy candy material.

28. The method of claim 27 wherein the amorphous candy material is at a temperature of about 75° C. and the chewy candy material is at a temperature of between about 35° C. and 40° C. when combined.

29. A confectionary product comprising
   a) a chewy center having a water activity and comprising an indigestible dextrin, sweetener, between about 6% and 8% water, and flavor; wherein the chewy center does not comprise a chewing gum base;
   b) an intermediate layer having a water activity and comprising sweetener and flavor, wherein the intermediate layer is at least partially crystalline and substantially covers the chewy center, and wherein the water activity of the chewy center is greater than the water activity of the intermediate layer; and
   c) a crunchy hard shell outer layer comprising sweetener and flavor.

30. The confectionary product of claim 29 wherein the indigestible dextrin comprises a branched maltodextrin.

31. The confectionary product of claim 29 wherein the sweetener in the chewy center comprises sucrose and corn syrup.

32. The confectionary product of claim 29 wherein the sweetener in the chewy center comprises hydrogenated starch hydrolysate syrup and isomalt.

33. The confectionary product of claim 29 wherein the chewy center further comprises gum arabic.

34. The confectionary product of claim 29 wherein the chewy center further comprises fat.

* * * * *